United States Patent [19]
Mizusawa et al.

[11] Patent Number: 5,687,097
[45] Date of Patent: Nov. 11, 1997

[54] METHOD AND APPARATUS FOR EFFICIENTLY DETERMINING A FRAME MOTION VECTOR IN A VIDEO ENCODER

[75] Inventors: Hideyuki Mizusawa; Shunichi Masuda, both of Mountain View; Masashi Tayama, Sunnyvale, all of Calif.

[73] Assignee: Zapex Technologies, Inc., Mountain View, Calif.

[21] Appl. No.: 502,565

[22] Filed: Jul. 13, 1995

[51] Int. Cl.$^6$ ..................................................... G06F 17/00
[52] U.S. Cl. ............................................................ 364/514 R
[58] Field of Search ............................ 364/514 A, 514 R, 364/715.02; 348/699, 412, 416, 402

[56] References Cited

U.S. PATENT DOCUMENTS

| | | | |
|---|---|---|---|
| 4,691,230 | 9/1987 | Kaneko et al. | 348/699 |
| 4,760,445 | 7/1988 | Mijiyawa | 348/699 |
| 4,838,685 | 6/1989 | Martinez et al. | 348/416 |
| 4,862,260 | 8/1989 | Harradine et al. | 348/699 |
| 5,005,077 | 4/1991 | Samad et al. | 348/699 |
| 5,012,336 | 4/1991 | Gillard | 348/699 |
| 5,151,784 | 9/1992 | Lavagetto et al. | 348/699 |
| 5,210,605 | 5/1993 | Zaccarin et al. | 348/699 |
| 5,278,647 | 1/1994 | Hingorani et al. | 348/699 |
| 5,347,309 | 9/1994 | Takahashi | 348/420 |
| 5,369,449 | 11/1994 | Yukitake et al. | 348/699 |
| 5,510,856 | 4/1996 | Jung | 348/699 |

OTHER PUBLICATIONS

Ishihara et al.; "A Half-Pel Precission MPEG2 Motion Estimation Processor with Concurrent Three Vector Search"; IEEE International Solid State Circuits Conference, 1995.

*Primary Examiner*—Ellis B. Ramirez
*Attorney, Agent, or Firm*—Blakely, Sokoloff, Taylor & Zafman LLP

[57] ABSTRACT

A method of implementing a fast video encoder by approximating a frame motion vector is introduced. MPEG-2 encoding uses both field and frame vectors in the encoding process. To implement an encoder in an efficient manner, an approximated motion vector created from two field motion vectors is used. The frame motion vector may be determined using the two field motion vectors alone, or by using the two field motion vectors in conjunction with their respective absolute error values. By using the disclosed methods, a motion estimation part for generating frame motion vector is not necessary. Only two field motion estimation parts are required to determine the field motion vectors, the frame motion vector is then approximated using the two field motion vectors. The cost and complexity of a digital video encoder system is thereby reduced.

16 Claims, 4 Drawing Sheets

METHOD AND APPARATUS FOR EFFICIENTLY DETERMINING A FRAME MOTION VECTOR IN A VIDEO ENCODER

FIELD OF THE INVENTION

The present invention relates to the compression of the amount of data necessary to reproduce a high quality of video picture. In particular, the present invention discloses an efficient method for implementing an digital video encoder that compresses a video signal into a digital bitstream.

BACKGROUND OF THE INVENTION

Digital video is a rapidly growing application of computer technology. However, there are difficulties associated with digital video. One of the most common difficulties is handling the large amounts of data since when an analog video signal is digitized into digital video data, the amount of digital video data produced is enormous, even for short video signals.

To reduce the amount of digital data required to represent an analog video signal, compression algorithms are used. Most video compression algorithms reduce the amount of data required to represent the video by taking advantage of the redundancy between successive video frames (temporal redundancy). "Motion compensation" is one compression technique that takes advantage of the temporal redundancy within a video signals.

The technique of motion compensation is used in the ISO international standards for moving picture encoding commonly known as MPEG-1 and MPEG-2. MPEG is an acronym for Moving Picture Expert Group, the International Standards Organization (ISO) group responsible for generating a standardized compressed bit stream for digital video.

The technique of motion compensation operates by predicting motion from one video frame to the next video frame in the temporal direction. In the MPEG-1 standard, motion prediction is done for several sub areas that comprise a full video frame. (The sub areas of the frame are known as macroblocks.) Simply stated, given the macroblock in a current frame that is being encoded, the encoder searches for a similar macroblock in a previous or future frame. Motion compensation is performed through the use of "motion vectors". A motion vector is a two-dimensional vector that provides an offset from the macroblock position in the current frame to the macroblock position in a reference frame (a previous or future frame). Selecting the optimal motion vector for each macroblock is very difficult task for a video encoder. To select the motion vector, "motion estimation" is performed. Motion estimation is the process of estimating motion vectors during the encoding process.

The compressed bit stream defined in the ISO MPEG-1 standard only defined a compression format for progressive (noninterlaced) video frames. However, most video signals use interlaced video frame images. Interlaced video frames consist of two consecutive video "fields" where each video field defines every other line of a video frame. There are several possible methods for compressing interlaced video. One method involves merging the consecutive interlaced fields together into video frames. The video fields would then be compressed as single video frame as specified in the MPEG-1 standard. However, this technique can result in undesirable motion artifacts that due to the fact that moving objects are in different places during the two consecutive fields. Another technique is to code the even and odd field streams separately. This technique avoids the above described motion artifacts, however, the compression is not as efficient since the redundancy between the even and odd fields is not taken advantage of.

The proposed MPEG-2 standard uses a combination of the those two techniques. In an MPEG-2 encoder, the motion estimation unit generates three separate motion vectors: a field1 (top field) motion vector, a field2 (bottom field) motion vector, and a frame motion vector. The frame motion vector is a motion vector for a video frame consisting of two interlaced fields. The encoder then determines which of the single frame motion vector technique or the two field motion vectors technique will result in better compression. The technique that results in more efficient encoding is then used to encode the frame or fields.

During motion estimation, the encoder determines an "absolute error" (AE) value for each possible motion vector choice to determine the efficiency of that possible motion vector choice. To determine the absolute error (AE) of a frame macroblock motion vector, the following relation is used:

$$(AE\_frame) = (AE\_field1) + (AE\_field2)$$

where AE_xxxxx represents the absolute error for a macroblock. Many possible motion vectors are tested and the motion vectors that provide the minimum absolute error values are selected as the motion vectors for the two fields and the frame. Stated in equation form:

$$(\text{Motion Vector of field1}) = (x,y) \text{ that has the minimum } AE\_field1(x,y)$$

$$(\text{Motion Vector of field2}) = (x,y) \text{ that has the minimum } AE\_field2(x,y)$$

$$(\text{Motion Vector of frame}) = (x,y) \text{ that has the minimum } AE\_frame(x,y)$$

To search for a motion vector, a motion estimation unit usually examines for matches using the nearby macroblocks. The motion estimation unit determines the field1 motion vector (MV_Field1), the field2 motion vector (MV_Field2), and the frame motion vector (MV_Frame). The following pseudo-code listing describes a standard motion estimation routine for determining the frame motion vector and the field motion vectors:

```
                 Pseudo-code #1: Motion Estimation

Min_Frame = MAXINT;    /*Set to largest possible Integer */
Min_Field1 = MAXINT;   /*Set to largest possible Integer */
Min_Field2 = MAXINT;   /*Set to largest possible Integer */
for (y = -YRange ; y < YRange ; y ++) {    /*Search Y range */
    for (x = -XRange ; x < XRange ; x ++) { /* Search X range */
        /*Determine the field1 Absolute Error for this (x,y) */
        AE_Field1 = AE_Macroblock(prediction_mb(x,y),
                    lines_of_Field1_of_current_mb);
        /*Determine the field2 Absolute Error for this (x,y) */
        AE_Field2 = AE_Macroblock(prediction_mb(x,y),
                    lines_of_Field2_of_current_mb);
        /*Determine the frame Absolute Error for this (x,y) */
        AE_Frame = AE_Field1 + AE_Field2;
        if (AE_Field1 < Min_Field1) { /*Smallest AE for field1?*/
            MV_Field1 = (x,y);      /* Yes, set the field1 MV*/
            Min_Field1 = AE_Field1; /*Set current min field1 AE*/
        }
        if (AE_Field2 < Min_Field2) { /*Smallest AE for field2?*/
            MV_Field2 = (x,y);      /* Yes, set the field2 MV*/
            Min_Field2 = AE_Field2; /*Set current min field2 AE*/
```

```
                Pseudo-code #1: Motion Estimation

}
      if (AE_Frame < Min_Frame) {   /*Smallest AE for frame?*/
          MV_Frame = (x,y);          /* Yes, set the frame MV*/
          Min_Frame = AE_Frame;      /*Set current min frame AE*/
      }
    }
  }
```

When an MPEG-2 encoder is implemented in hardware, a dedicated chip for motion estimation is usually employed for quickly selecting motion vectors. Almost all of the existing motion estimation chips only have reference field image data and search area image data inputs, and an estimated motion vector output. To obtain the absolute error information, a second step is required. Specifically, the requester must supply the motion estimation chip with the (x, y) position for the desired absolute error value and the motion estimation chip outputs the absolute error (AE) corresponding to the specified (x, y) location. As illustrated in the above pseudo-code, the absolute error (AE) values from both fields (AE_Field1 & AE_Field2) are required during every iteration of the loop to determine the frame motion vector. In order to perform very fast encoding, it is not possible to both generate the field motion vectors and later query the field vector motion estimation chips for their absolute error (AE) values. Thus, additional motion estimation chips are required such that field motion estimation and frame motion estimation can be performed concurrently. In summary, even though the absolute error information for each tested field motion vector is available, it is not practical to use the same two motion estimation chips to determine a field1 motion vector, a field2 motion vector, and a frame motion vector. Thus, individual integrated circuit (IC) chips sets are used for each field1, field2 and frame for motion vector determination. A typical prior art motion estimation system is illustrated in FIG. 1.

The motion estimation unit illustrated in the block diagram of FIG. 1 uses a separate logic circuits for field1 motion estimation, field2 motion estimation, and frame motion estimation. The logic circuits for the frame motion estimation is especially complicated since it must generate absolute error (AE) values for both fields. Having dedicated logic circuits for each motion estimation unit is expensive, consumes a significant amount of power, and generates a significant amount of heat, and requires a large amount of space. Thus, it would be desirable to have a motion estimation unit for a moving picture compression system that costs less and requires less space.

SUMMARY AND OBJECTS OF THE INVENTION

It is therefore an object of the present invention to reduce the cost and complexity of a digital video encoder system. Specifically, it is a object of the present invention to reduce the cost and complexity of the determining motion vectors for a video compression encoder.

The present invention introduces the concept of approximating the frame motion vector by using the two field motion vectors. The frame motion vector may be determined using the two field motion vectors alone, or by using the two field motion vectors in conjunction with their respective absolute error values. By using methods in this invention, a motion estimation part for generating frame motion vector is not necessary. Only two field motion estimation parts are required to determine the field motion vectors, the frame motion vector is then approximated using the two field motion vectors.

Other objects, features and advantages of the present invention will be apparent from the accompanying drawings, and from the detailed description that follows below.

BRIEF DESCRIPTION OF THE DRAWINGS

The objects, features, and advantages of the present invention will be apparent from the following detailed description of the preferred embodiment of the invention with references to the following drawings.

DETAILED DESCRIPTION

A method and apparatus for performing frame motion vector estimation by using the information provided from two field motion vector estimation is disclosed. In the following description, for purposes of explanation, specific nomenclature is set forth to provide a thorough understanding of the present invention. However, it will be apparent to one skilled in the art that these specific details are not required in order to practice the present invention. In other instances, well known circuits and devices are shown in block diagram form in order not to obscure the present invention unnecessarily.

To perform MPEG-2 encoding, three different motion vectors are required during the encoding process, a field1 motion vector, a field2 motion vector, and a frame motion vector. Motion estimation is used to determine the motion vectors. Performing motion estimation to determine all three different motion vectors is a computationally intensive task. By using methods in of the present invention, a motion estimation part for determining a frame motion vector is not necessary. Instead, the present invention introduces the concept of approximating the frame motion vector by using two field motion vectors.

Figure 1:
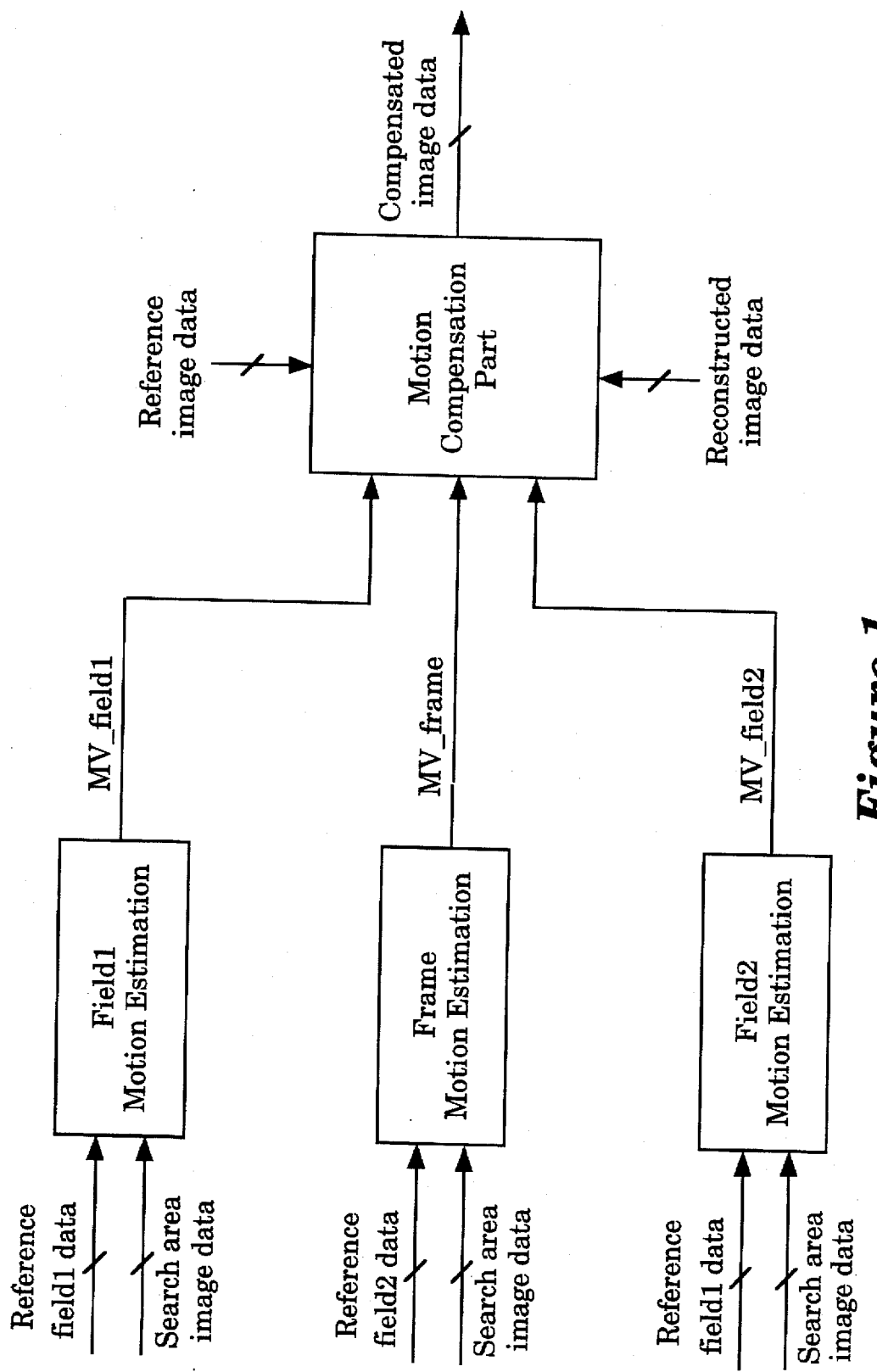
FIG. 1 illustrates a block diagram of a prior art apparatus for generating field1, field2, frame motion vectors and performing motion compensation.
Figure 2:
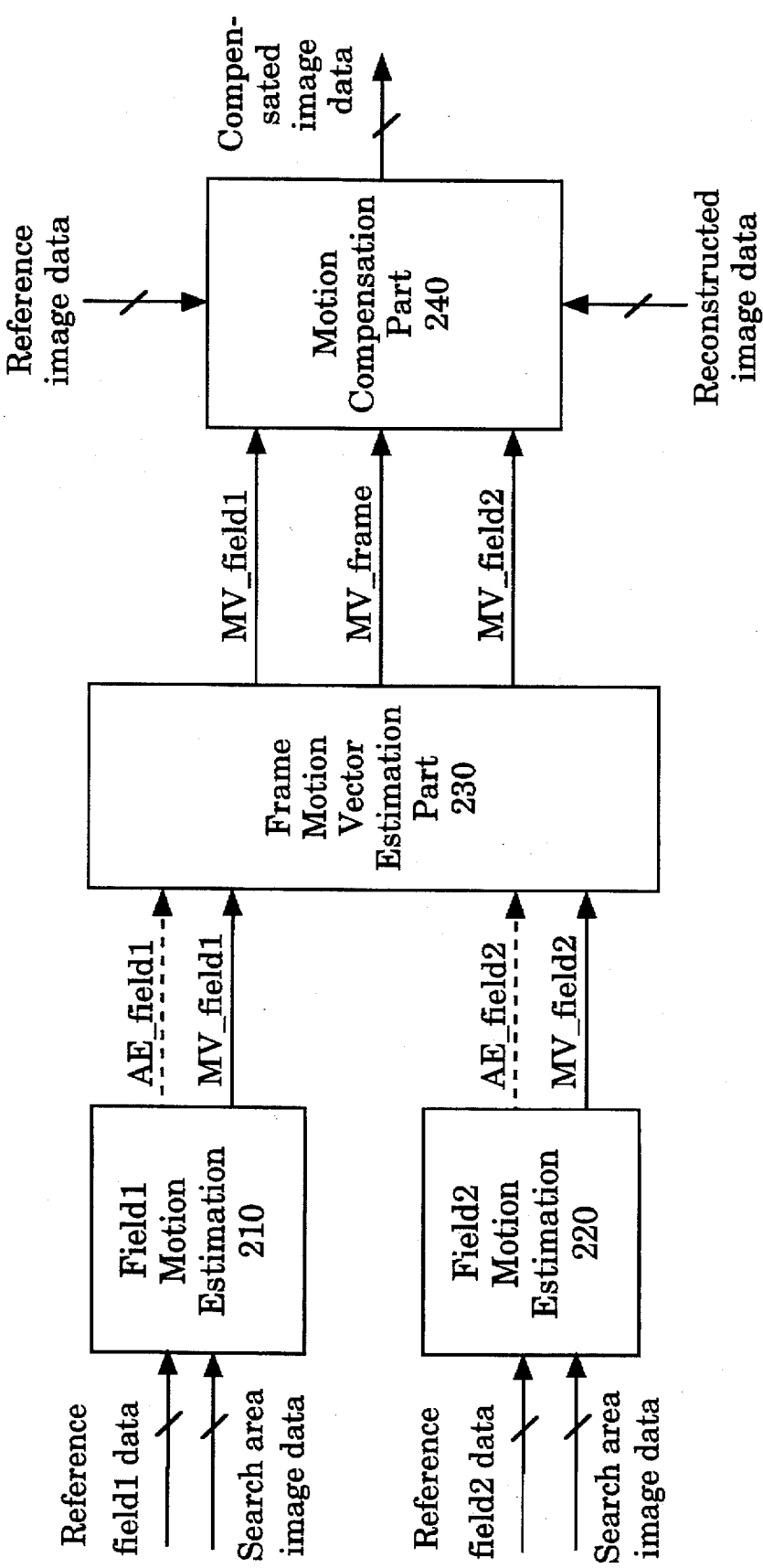
FIG. 2 illustrates a block diagram of the present invention implementation of an apparatus for generating field1, field2, frame motion vectors and performing motion compensation.

A frame motion vector may be approximated using two field motion vectors alone, or by using two field motion values in conjunction with their respective absolute error values. FIG. 2 illustrates a block diagram of a motion estimation system that uses only two motion estimation circuits. As illustrated in FIG. 2, two field motion estimation units (210 and 220) generate respective field motion vectors (MV_field1 and MV_field2). Each field motion vectors has a corresponding absolute error value (AE_field1 and AE_field2). The field motion vectors (and in some cases, the corresponding absolute error values) are passed to a frame motion vector estimation part 230. The frame motion vector estimation part 230 generates an approximated frame motion vector using the field motion vectors (and in some cases, the corresponding absolute error values). The motion estimation system of FIG. 2 can be constructed with significantly smaller number of integrated circuits than the motion estimation system of FIG. 1. Thus, the motion estimation system of the present invention can be constructed at a reduced cost. Furthermore, the motion estimation system of the present invention will consume less power, generate less heat, and require less space.

Several different techniques can be used to approximate the frame motion in the frame motion vector estimation part 230 of FIG. 2. This specification will list six possible methods, however, using the general principals of the present invention other techniques may be devised.

Technique #1

Frame Motion Vector Approximation Using One Field Motion Vector

A first method of approximating a frame motion vector is to just use one of the two field motion vectors. For example, using the motion vector for field1, the motion vector for the frame would be:

$$MVx\_frame = MVx\_field1$$

$$MVy\_frame = 2 \times MVy\_field1$$

Note that since the size of a frame in the y direction (the number of lines) is twice the size of a field in the y direction, thus the size of the y component of the frame motion vector is doubled. Similarly, using the motion vector for field2, the approximated frame motion vector would be:

$$MVx\_frame = MVx\_field2$$

$$MVy\_frame = 2 \times MVy\_field2$$

Technique #2

Frame Motion Vector as the Average of the Two Field Motion Vectors

A second technique for quickly determining a frame motion vector would be to use an arithmetic average value of two field motion vectors. Stated in equation form, the frame motion vector is be calculated as follows:

$$MVx\_frame = \frac{(MVx\_field1 + MVx\_field2)}{2}$$

$$MVy\_frame = (MVy\_field1 + MVy\_field2)$$

Note that the MVy_frame component does not have to be divided by two since the size of a frame in the y direction (the number of lines) is twice the size of a field in the y direction.

Technique #3

Frame Motion Vector Set to the Field Motion Vector Having the Least Error

When the field motion vectors are determined, each field motion vector has an accompanying absolute error value. A third method of quickly determining a frame motion vector is to use the field motion vector having the smallest absolute error value as the frame motion vector. Note that the y component of the field motion vector must be doubled to scale it up. The following pseudo-code illustrates how the two absolute error values are compared and the two field motion vector having the smaller absolute error value is selected as the frame motion vector.

```
if (AE_field1 < AE_field2) { /* Is field1's AE less than field2's AE ?*/
    MVx_frame = MVx_field1 /*Yes, use field1's motion vector*/
    MVy_frame = 2 * MVy_field1
} else {
    MVx_frame = MVx_field2 /*No, use field2's motion vector*/
    MVy_frame = 2 * MVy_field2
}
```
Pseudo-code #2: Least Error Field motion vector as Frame Motion Vector

Technique #4

Frame Motion Vector as the Weighted Average of Field Motion Vectors

Figure 3:
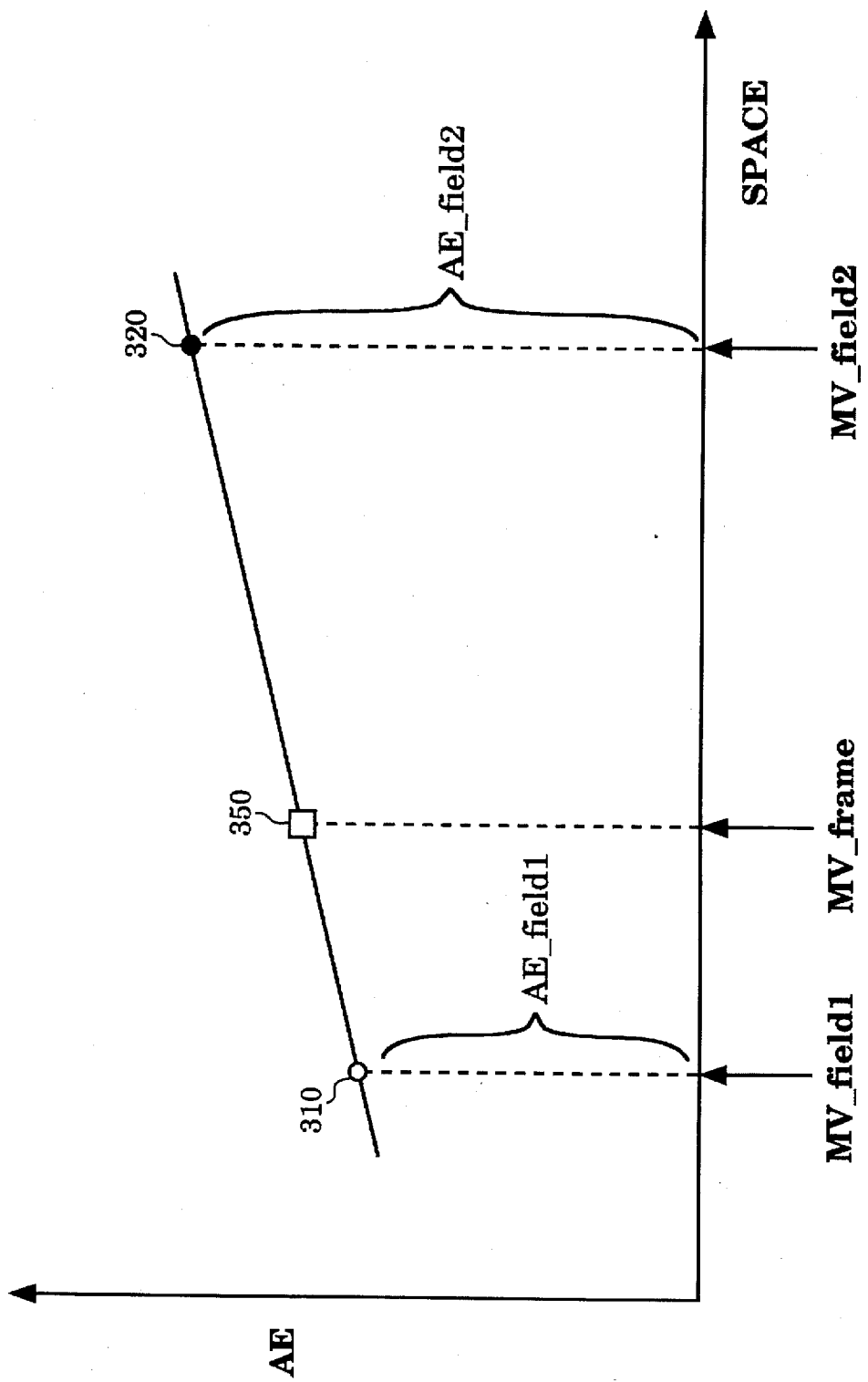
FIG. 3 is a conceptual diagram that illustrates a method of selecting a frame motion vector that is a weighted average of the field motion vectors.

Another possible technique for determining a motion vector for the frame would be to use a weighted average motion vector where the motion vector with the smaller error is given the greater weight. FIG. 3 shows a conceptual illustration of this method. On FIG. 3, the vertical axis represents an absolute error value for a particular motion vector and the horizontal axis represent a spatial position (x or y) of that motion vector. Empty circle 310 denotes a field1 motion vector position and the corresponding AE_field1 absolute error value. The filled circle 320 denotes a field2 motion vector position and the corresponding AE_field2 absolute error value. To determine a frame motion vector using a weighted average of field motion vectors where the weighting is based on the absolute error values (AE_field1 and AE_field2), the following equation is used:

$$MVx\_frame = \frac{(MVx\_field1 \times AE\_field2 + MVx\_field2 \times AE\_field1)}{(AE\_field1 + AE\_field2)}$$

$$MVy\_frame = 2 \times \frac{(MVy\_field1 \times AE\_field2 + MVy\_field2 \times AE\_field1)}{(AE\_field1 + AE\_field2)}$$

Referring again to FIG. 3, a square shows a position of an approximated frame motion vector and corresponding AE_frame absolute error value. Note that the position of the approximated frame motion vector is closer to the field1 motion vector since the field1 motion vector had a smaller absolute error value.

Technique #5

Frame Motion Vector Using a Minimum Sum Point

Another possible technique for determining a motion vector for the frame would be to use a point that identifies the minimum sum of two numerical expressions that approximate the absolute error values for the field motion vectors. To determine the minimum sum point, 3 different field motion vectors with corresponding absolute errors (AE) are determined for each field in each dimension (x and y). One of the field motion vectors is the field motion vector with the minimum absolute error (AE) value and the other two are nearby neighbors as picked from the field estimation part. The three selected field motion vectors and corresponding absolute errors (AE) are fitted into a simple numeric equation. For an example, this specification will use a quadratic equation, however other possible numeric equations can be used.

Figure 4:
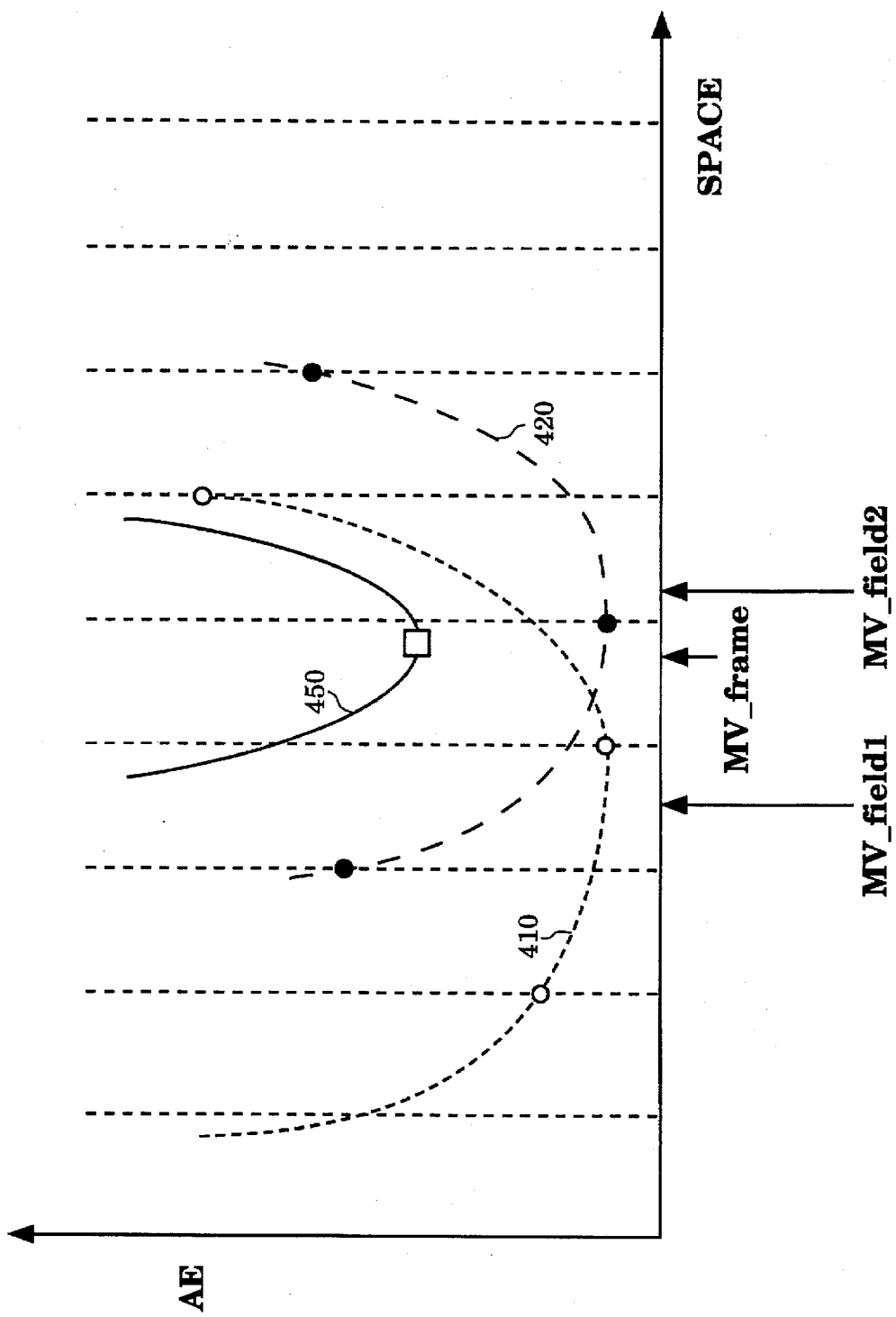
FIG. 4 is a conceptual diagram that illustrates a method of selecting a frame motion vector that is a minimum sum of two quadratic equations.

FIG. 4 illustrates a plot of two field vectors where three points have been used to fit the absolute error values into numeric equations. The vertical axis in FIG. 4 denotes the value of absolute errors and the horizontal axis shows a spatial position (x or y) which is expressed as X. In FIG. 4, the field vectors have been fitted into the following quadratic equations:

$$AE\_field1 = aX^2 + bX + c$$

$$AE\_field2 = dX^2 + eX + f$$

where a, b, c are constants that are determined using the three given data points for the field1 motion vector and d, e, f are constants that are determined using the three given data points for the field2 motion vector. In FIG. 4, the dashed line 410 is the numerical expression for AE_field1 and dashed line 420 is the numerical expression for AE_field2.

When the positions of the absolute error values for the two field motion vectors are sufficiently close to each other, the absolute error value for an approximated frame motion vector can be expressed in the following sum equation:

$$AE\_frame = (a+b)X^2 + (b+e)X + (c+f)$$

Referring again to FIG. 4, the numerical expression of AE_frame is expressed as solid line 450. Since the minimum sum equation for AE_frame is a quadratic equation, the minimum position can be determined by differentiating the equation and setting it equal to zero. Thus, the spatial position of the frame motion vector is determine by differentiating the minimum sum equation, setting it equal to zero, and solving for X as illustrated below:

$$0 = AE\_frame\_fn(X)'$$

$$0 = \frac{d[(a+b)X^2 + (b+e)X + (c+f)]}{dX}$$

$$0 = 2(a+b)X + (b+e)$$

solving for X $$X = \frac{-(b+e)}{2(a+b)}$$

Thus, by substituting the constants b, e, a, b, as determine in the above equations, the spatial position of the approximated frame motion vector having the minimum absolute error can be easily calculated.

Technique #6

Frame Motion Vector using Combined Techniques

In some situations, using a combination the preceding techniques are useful for frame motion estimation. For example, technique #5 is best suited to situations where the two field motion vectors are very similar. Thus, when the two field motion vectors are within a certain threshold value, technique #5 should be used. However, if the two field motion vectors are very different, then another technique should be used. For example, if the two field motion vectors are not within a certain threshold value, then technique #3 or technique #4 could be used. This is only one example of how the different techniques can be combined. It is easily recognized by those skilled in the art the different techniques can be combined in many different ways.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A computer implemented method for generating a frame motion vector, said method comprising the steps of:

selecting a field1 motion vector from a current field1 and a reference field1 using motion estimation, said field1 motion vector having an MVx_field1 component and an MVy_field1 component;

selecting a field2 motion vector from a current field2 and a reference field2 using motion estimation, said field2 motion vector having an MVx_field2 component and an MVy_field2 component;

determining a frame motion vector using a combination of said field1 motion vector and said field2 motion vector, said frame motion vector having an MVx_frame component and an MVy_frame component.

2. The computer implemented method as claimed in claim 1 wherein said step of determining a frame motion vector comprises setting the MVx_frame component equal to said MVx_field1 component and setting the MVy_frame component equal to twice the value of said MVy_field1 component.

3. A The computer implemented method as claimed in claim 1 wherein said step of determining a frame motion vector comprises setting the MVx_frame component equal to said MVx_field2 component and setting the MVy_frame component equal to twice the value of said MVy_field2 component.

4. The computer implemented method as claimed in claim 1 wherein said step of determining a frame motion vector comprises setting the MVx_frame component equal to an average of said MVx_field1 and said MVx_field2 component and setting the MVy_frame component equal to the sum of said MVy_field1 component and said MVy_field2 component.

5. The computer implemented method as claimed in claim 1 wherein said field1 motion vector has a corresponding absolute error value AE_field1, said field2 motion vector has a corresponding absolute error value AE_field2, and said step of determining a frame motion vector comprises setting said frame motion vector using the following pseudocode:

```
if (AE_field1 < AE_field2) { /* Is field1's AE less than field2's AE ?*/
    MVx_frame = MVx_field1 /*Yes, use field1's motion vector*/
    MVy_frame = 2 * MVy_field1
} else {
    MVx_frame = MVx_field2 /*No, use field2's motion vector*/
    MVy_frame = 2 * MVy_field2
}.
```

6. The computer implemented method as claimed in claim 1 wherein said field1 motion vector has a corresponding absolute error value AE_field1, said field2 motion vector has a corresponding absolute error value AE_field2, and said step of determining a frame motion vector comprises setting said frame motion vector using the following formula:

$$MVx\_frame = \frac{(MVx\_field1 \times AE\_field2 + MVx\_field2 \times AE\_field1)}{(AE\_field1 + AE\_field2)}$$

$$MVy\_frame = 2 \times \frac{(MVy\_field1 \times AE\_field2 + MVy\_field2 \times AE\_field1)}{(AE\_field1 + AE\_field2)}.$$

7. The computer implemented method as claimed in claim 1 wherein said field1 motion vector has a corresponding absolute error value AE_field1, said field2 motion vector has a corresponding absolute error value AE_field2, and said step of determining a frame motion vector comprises the substeps of:

approximating the function of absolute error value for said field1 motion vectors using a first equation;

approximating the function of absolute error value for said field2 motion vectors using a second equation;

approximating the function of absolute error value for said frame motion vector using a sum equation of said first equation and said second equation to create a frame error approximation equation; and solving said frame error approximation equation at a minimum value to obtain an approximate frame vector.

8. The computer implemented method as claimed in claim 1 wherein said step of determining a frame motion vector comprises the substeps of:

comparing said field1 motion vector with said field2 motion vector to determine if said field1 motion vector is within a threshold value of said field2 motion vector;

determining a frame motion vector using a first combination of said field1 motion vector and said field2 motion vector if said field1 motion vector is within a threshold value of said field2 motion vector;

determining a frame motion vector using a second combination of said field1 motion vector and said field2 motion vector if said field1 motion vector is not within a threshold value of said field2 motion vector.

9. An apparatus for generating a motion vector for a frame, said apparatus comprising the elements of:

a field1 motion estimation circuit, said field1 motion estimation circuit determining a field1 motion vector from a current field1 and a reference field1 using motion estimation, said field1 motion vector having an MVx_field1 component and an MVy_field1 component, said field1 motion vector having a corresponding absolute error value AE_field1;

a field2 motion estimation circuit, said field2 motion estimation circuit determining a field2 motion vector from a current field2 and a reference field2 using motion estimation, said field2 motion vector having an MVx_field2 component and an MVy_field2 component, said field2 motion vector having a corresponding absolute error value AE_field2; and a frame motion estimation circuit, said frame motion estimation circuit coupled to said field1 motion estimation circuit and to said field2 motion estimation circuit, said frame motion estimation circuit generating a frame motion vector using a combination of said field1 motion vector and said field2 motion vector, said frame motion vector having an MVx_frame component and an MVy_frame component.

10. The apparatus as claimed in claim 9 wherein said frame motion estimation circuit generates said frame motion vector by setting the MVx_frame component equal to said MVx_field1 component and setting the MVy_frame component equal to twice the value of said MVy_field1 component.

11. The apparatus as claimed in claim 9 wherein said frame motion estimation circuit generates said frame motion vector by setting the MVx_frame component equal to said MVx_field2 component and setting the MVy_frame component equal to twice the value of said MVy_field2 component.

12. The apparatus as claimed in claim 9 wherein said frame motion estimation circuit generates said frame motion vector by setting the MVx_frame component equal to an average of said MVx_field1 and said MVx_field2 component and setting the MVy_frame component equal to the sum of said MVy_field1 component and said MVy_field2 component.

13. The apparatus as claimed in claim 9 wherein said frame motion estimation circuit generates said frame motion vector using the following pseudo-code:

```
if (AE_field1 < AE_field2) { /* Is field1's AE less than field2's AE ?*/
    MVx_frame = MVx_field1  /*Yes, use field1's motion vector*/
    MVy_frame = 2 * MVy_field1
} else {
    MVx_frame = MVx_field2  /*No, use field2's motion vector*/
    MVy_frame = 2 * MVy_field2
}.
```

14. The apparatus as claimed in claim 9 wherein said frame motion estimation circuit generates said frame motion vector using the following formula:

$$MVx\_frame = \frac{(MVx\_field1 \times AE\_field2 + MVx\_field2 \times AE\_field1)}{(AE\_field1 + AE\_field2)}$$

$$MVy\_frame = 2 \times \frac{(MVy\_field1 \times AE\_field2 + MVy\_field2 \times AE\_field1)}{(AE\_field1 + AE\_field2)}.$$

15. The computer apparatus as claimed in claim 9 wherein said frame motion estimation circuit generates said frame motion vector approximates a first function for the absolute error value for said field1 motion vector, approximates a first function for the absolute error value for said field2 motion vector, and determines a frame motion vector by determining a position having a minimum value for a sum of said first function and said second function.

16. The apparatus as claimed in claim 9 further comprising a vector comparison circuit for comparing said field1 motion vector with said field2 motion vector to determine if said field1 motion vector is within a threshold value of said field2 motion vector;

wherein said frame motion estimation circuit generates said frame motion vector using a first combination of said field1 motion vector and said field2 motion vector if said field1 motion vector is within a threshold value of said field2 motion vector, else said frame motion estimation circuit generates said frame motion vector using a second combination of said field1 motion vector and said field2 motion vector if said field1 motion vector is not within a threshold value of said field2 motion vector.

* * * * *